(No Model.)

C. G. ANDERSON.
INCANDESCENT ELECTRIC LAMP.

No. 363,500. Patented May 24, 1887.

Witnesses:
A. Wahlberg
F. M. Crossman

Inventor
C. G. Anderson
by A. W. Almqvist
Attorney

UNITED STATES PATENT OFFICE.

C. GUSTAF ANDERSON, OF HARTFORD, CONNECTICUT.

INCANDESCENT ELECTRIC LAMP.

SPECIFICATION forming part of Letters Patent No. 363,500, dated May 24, 1887.

Application filed March 5, 1886. Serial No. 194,103. (No model.)

*To all whom it may concern:*

Be it known that I, C. GUSTAF ANDERSON, a citizen of Sweden, and a resident of Hartford, in the county of Hartford and State of Connecticut, have invented a new and useful Improvement in Incandescent Electric Lamps, of which the following is a specification.

The invention relates to that class of lamps so-called "glow-lamps," in which the light is produced by passing an electric current through an incandescent body—such as a carbon or platinum wire—*in vacuo*.

The invention comprises, mainly, the following: A substantially spherical globe having convex poles or electrodes, between which the carbon is connected, arranged at diametrically-opposite points corresponding to concave pole-pieces in the opposite ends of a bail-shaped spring-frame, in which it is attached, and put in circuit by merely pressing it in to expand the frame, and is retained in position by the counter-pressure due to the elasticity of the frame. This expansion or widening of the frame (a switch being placed in position for lighting the lamp) breaks a short circuit through a bridge rigidly secured at one end to the frame and movably secured at the other end. When the globe is removed or the switch turned to put out the light, the contraction of the spring-frame again makes circuit through the said bridge. A non transparent semi-spherical and adjustable cover on the globe reflects and directs the light in the direction desired and shades it from the opposite side.

The invention will be hereinafter more fully described, and specifically pointed out in the claims, reference being had to the accompanying drawings, in which—

Figure 1:
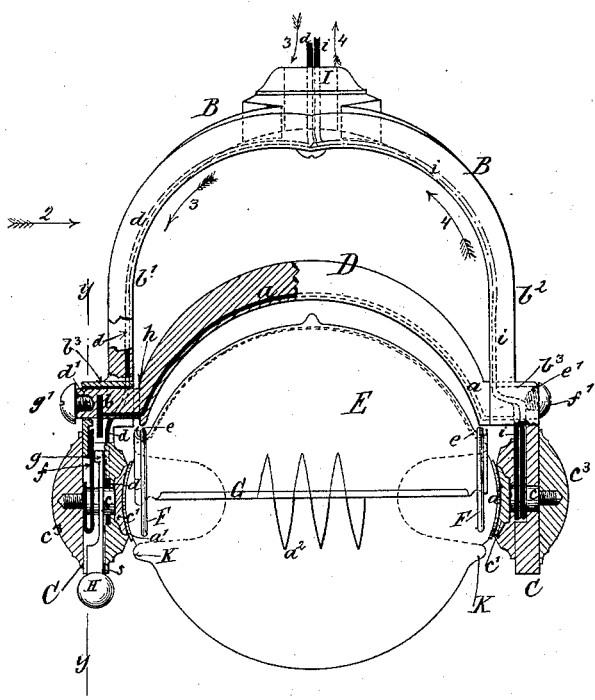
Figure 2:
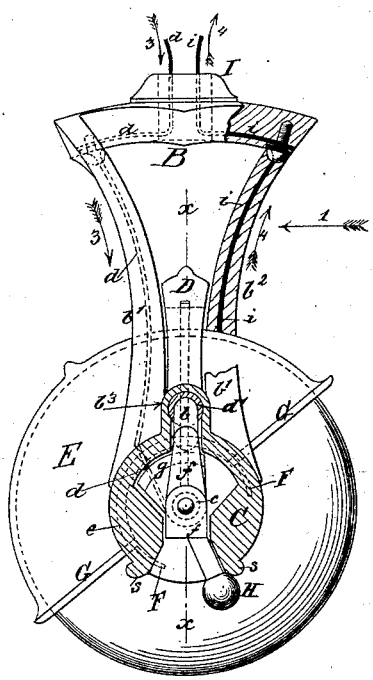
Figure 3:
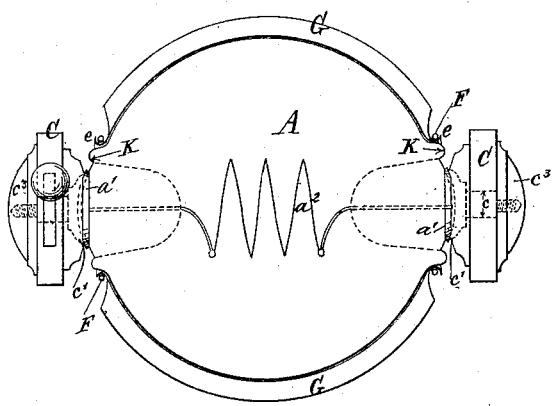
Figure 4:
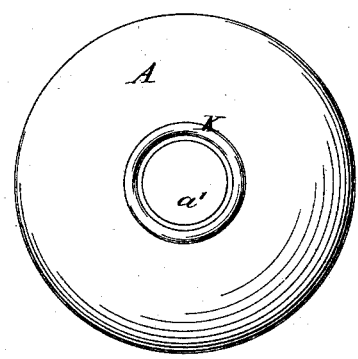

Figure 1 represents a front view of my improved incandescent electric lamp, partly in section, on the line $x\,x$ of Fig. 2, and seen in the direction of arrow 1, part of the frame being broken out beyond the line $x\,x$. Fig. 2 is a side view of the same, partly in section, on the line $y\,y$ of Fig. 1, and seen in the direction of arrow 2, part of the frame being broken out beyond the line $y\,y$. Fig. 3 is a view from the under side of Fig. 1. Fig. 4 is an outside view of the glass globe detached and seen from one of its poles.

A is the globe, made in the shape of a spheroid or other regular body, which will admit of attaching the poles $a'$ diametrically opposite to each other at opposite ends of the same axial line. The poles $a'$ are metallic, preferably circular disks, conforming to the convexity of the globe, and interconnected by the carbon or other incandescent wire $a^2$. The convex metallic pole-pieces $a'$ are of course the terminals of the incandescing filament $a$, and not a part of the non-conducting glass globe A, but are simply attached thereto.

B is the bail shaped frame supporting the globe, and whose depending arms $b'$ and $b^2$ have hubs or pole-centers C, in which are fastened concave pole-pieces $c'$, arranged to receive between them the convex disks $a'$ of the globe A. The stems $c$ of the concave metallic pieces $c'$, passing through the non-conducting pole-centers C, are reduced on their outer ends and threaded to receive a nut, $c^3$, also of non-conducting material, by which it is held in place. The frame B is made of black rubber or other suitable material, wholly or partly elastic, in such a manner as to have a tendency to move the pole-pieces $c'$ toward each other, and by the friction due to the force of the said elasticity to retain the globe A suspended in the frame when the said globe is inserted between them, as in Fig. 1, the pole-pieces $a'$ and $c'$, at diametrically-opposite points of the globe, being in metallic contact with each other.

Above the centers C the frame B has lugs $b^3$ bored to receive the correspondingly-shaped ends or journals $d'\ e'$, of a bridge-piece, D, which reaches across the frame B from one of its arms, $b^2$, to the other, $b'$, one of the said ends or journals, $e'$, being rigidly secured in the lug $b^3$ by a set-screw, $f'$, but the other journal, $d'$, being longer than its bearing, so that the latter can slide on it a little to expand the frame when inserting or removing the globe A. A screw, $g'$, tapped in the journal $d'$, prevents accidental overstraining of the frame by limiting the outward or spreading movement to that needed for removing the globe only, and a shoulder, $h$, upon the bridge D, at the inner end of the journal $d'$, limits the movement of contraction due to the elasticity of the frame, so that the shortest distance between the pole-pieces $c'$, when the globe A is removed, will be just sufficient to correspond with the shortest distance apart between the disks $a'$ of the globe, in order that the latter may be conveniently entered by simply pushing it in between and springing apart the centers C until the centers of the pole-pieces $c'$ $a'$ coincide, the frame B, of course, gradually contracting when the centers of the disks $a'$ have passed within the circumference of the pieces $c'$. The electric wires run down from the suspension-point I of the frame to the stems $c$, with which they are constantly in metallic connection, the electric current passing, for instance, down through the wire $d$ and arm $b'$ in the direction of arrow 3, (see Figs. 1 and 2,) through the stems $c$, pole-pieces and carbon of the lamp, and up again through the wire $i$ in the arm $b^2$, in the direction of arrow 4, the switch and all parts being shown in position as when the lamp is lighted.

In the bridge D is a wire, $a$, one end of which is fixed in metallic contact with the wire $i$, and the other end in metallic contact with a little plate, $b$, which projects laterally from the journal $d'$ toward the stem $c$.

The switch consists simply of a little flat spring, $f$, and a segment, $g$. The spring is bent back nearly upon itself, in the shape of a U, of which the upstroke, representing the free end of the spring, is longer than the downstroke, the shorter of the two being rigidly secured to the stem, while the longer end is free to move toward the plate $b$ by the elasticity of the spring, unless prevented by the segment $g$. The segment $g$ is pivoted upon the stem $c$, and provided with a handle, H, by which it may be moved toward the right or left, as desired, the motion being limited by little stops $s$ on the circumference of the centers C, as shown in Fig. 2. The segment $g$ is wedge-shaped, or increasing in thickness from the left to the right, (looking at it in Fig. 2,) so that when placed in the position shown in the drawings the fixed part of the segment is in contact with the free end of the spring $f$, thereby keeping it away from the plate $b$, which causes the current to pass through the lamp and the carbon to glow.

If the globe is removed for some reason or other while the switch is left in the position shown, the contraction of the frame B causes the spring $f$ to move into contact with the plate $b$, just before the disks $a'$ of the globe have got out of contact with the pole pieces $c'$, thus forming what is called a "short-circuit," the current then passing through the wire $d$, the switch, and the plate $b$ by way of the wire $a$ to the wire $i$.

When it is desired to extinguish the light, the switch-handle H (see Fig. 2) is moved to the left stop, $s$, which allows the spring $f$ (see Fig. 1) to expand and make contact with the plate $b$, thus making the short circuit through the wire $a$. If the globe is removed from the frame when the switch is in the last-named position, the aforesaid short circuit is maintained, as the contraction of the frame B only causes the spring $f$ to press a little harder on the plate $b$. Consequently in all of the aforesaid cases the circuit between the inner and outlet ends of the wires at the point of suspension of the frame is never broken.

In order to shade one side of the globe and reflect the light in the opposite direction, I provide a non-transparent cap or shade, E, covering the half-circumference of the globe A. This is provided with a flange, G, for handling it and better defining the limiting-line of the shade and light.

Around the disks $a'$ there is formed in the glass of the globe a circular or annular bead, K, on which the semicircular and curled-up ends $e$ of the shade E fit to turn, and are held in place by a circular spring-wire, F, considerably larger than the semicircle of the bead K, as shown in Figs. 1 and 2.

It is evident that by this construction the shade E can be inclined and retained in any desired position upon the globe.

I do not limit myself to the exact construction of the switch shown, as that may be made in various ways so long as the contraction of the frame B on the removal of the globe A always makes the aforesaid short circuit through the wire $a$ whether the globe is removed when the lamp is lighted or when the light is put out.

The convexity and concavity, respectively, of the pole-pieces $a'$ $c'$ may be reversed, and the pole-pieces may be made to engage each other much deeper, if desired, than as shown in the drawings.

Having thus described my invention, what I claim as new in an electric glow-lamp, and desire to secure by Letters Patent, is—

1. The combination of a globe, A, having oppositely-placed pole-pieces $a'$, an elastic frame, B, having arms $b'$ $b^2$, with pole-pieces $c'$ clamping those of the globe by the force of said elasticity, a bridge-piece, D, having wire $a$ secured at one end in contact with one of the pole-wires $i$, and a switch for shunting the current through the other pole-wire, $d$, to the carbon $a^2$, or to the free end $b$ of the wire $a$, the relative movement between the frame and bridge establishing circuit by way of the said bridge-wire $a$ on removing the said globe, substantially as set forth.

2. In combination with a globe, A, having pole-pieces $a'$ in line with each other and suspended between similarly-arranged pole-pieces, $c'$, in a frame, B, the shade E, partly encircling the said globe and adjustable thereon, substantially as set forth.

In testimony that I claim the foregoing as my invention I have signed my name, in presence of two witnesses, this 5th day of January, 1886.

C. GUSTAF ANDERSON.

Witnesses:
 A. W. ALMQVIST,
 ALF. FORNANDER.